US006802276B2

(12) United States Patent
Sugimoto

(10) Patent No.: US 6,802,276 B2
(45) Date of Patent: Oct. 12, 2004

(54) METER APPARATUS AND A CHARACTER PLATE THEREOF

(75) Inventor: Hidetaka Sugimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/173,749

(22) Filed: Jun. 19, 2002

(65) Prior Publication Data

US 2002/0189526 A1 Dec. 19, 2002

(30) Foreign Application Priority Data

Jun. 19, 2001 (JP) ........................................ 2001-184998
Jun. 19, 2001 (JP) ........................................ 2001-184999

(51) Int. Cl.[7] ................................................ G01P 5/00
(52) U.S. Cl. ........................ 116/62.1; 116/286; 362/23; 340/870.02
(58) Field of Search .............................. 116/62.1, 284, 116/286–288, 298, 302, 305, 49; 362/23, 26; 340/815.53, 815.73, 870.02, 870.03

(56) References Cited

U.S. PATENT DOCUMENTS

| 2,627,245 | A | * | 2/1953 | Kiimball ..................... 116/290 |
| 2,664,849 | A | * | 1/1954 | Nallinger ................... 116/62.1 |
| 2,941,306 | A | * | 6/1960 | Uecker ......................... 33/322 |
| 3,720,800 | A | * | 3/1973 | Arnold ......................... 200/308 |
| 3,724,202 | A | * | 4/1973 | Feller .......................... 368/232 |
| 3,890,716 | A | * | 6/1975 | Hatch ........................... 33/1 D |
| 4,361,048 | A | * | 11/1982 | Huttinger .................... 73/729.2 |
| 5,129,269 | A | * | 7/1992 | Iizuka et al. ............... 73/866.3 |
| 5,248,108 | A | * | 9/1993 | Zander ..................... 242/348.3 |
| 5,710,545 | A | * | 1/1998 | Dunn ..................... 340/825.36 |
| 5,821,867 | A | * | 10/1998 | Angell et al. ........... 340/815.45 |
| 5,938,311 | A | * | 8/1999 | Takao et al. ................... 362/26 |
| 5,949,346 | A | * | 9/1999 | Suzuki et al. .......... 340/815.45 |
| 6,516,678 | B2 | * | 2/2003 | Hamilton et al. .......... 73/866.3 |
| 2003/0121467 | A1 | * | 7/2003 | Furuya ........................ 116/286 |

FOREIGN PATENT DOCUMENTS

JP           10-185630           7/1998

* cited by examiner

*Primary Examiner*—Diego Gutierrez
*Assistant Examiner*—Tania Courson
(74) *Attorney, Agent, or Firm*—Armstrong, Kratz, Quintos, Hanson & Brooks, LLP

(57) ABSTRACT

A meter apparatus and a character plate thereof is provided. A vehicle-use combination meter 1 as a meter apparatus has a casing 3, a speedometer 4a, an inside-cover plate 10, and a bulb 15. The speedometer 4a has a movement 7a accommodated in the casing 3, a pointer 12a attached to an output shaft 8a of the movement 7a, and a vehicle speed indication character plate 6a. The vehicle speed indication character plate 6a as a character plate of the meter apparatus has a circular plate member 20 and a ring-like framing member 21. A numerical scale 9b is formed on the surface 20a of the plate member 20. A morning sun expression 26 is provided on the surface 20a of the plate member 20. A peripheral scale 9a is formed on a second surface 21a of the framing member 21. A metal layer 31 is overlaid on the second surface 21a of the framing member 21. Grooves 32 are formed on the metal layer 31. The inside-cover plate 10 is attached to the casing 3. The bulb 15 is attached to the inside-cover plate 10. The bulb 15 is arranged nearer a crew than the vehicle speed indication character plate 6a. The bulb 15 illuminates the whole surface 20a of the plate member.

13 Claims, 6 Drawing Sheets

METER APPARATUS AND A CHARACTER PLATE THEREOF

BACKGROUND OF THE INVENTION

1. Field of the Invention

The present invention relates to a meter apparatus mounted on a moving body such as a motor vehicle and to a character plate used in the meter apparatus for indicating a measuring quantity with a pointer.

2. Description of the Related Art

A meter apparatus to indicate information measured by various measuring means to a crew is mounted on a motor vehicle as a moving body. A combination meter is used as such kind of meter apparatus, which combination meter has, for example, a speedometer to indicate the speed of a motor vehicle, a tachometer to indicate the rotation speed of an engine, a fuel gauge to indicate remaining quantity of the fuel, and a temperature gauge to indicate the temperature of the cooling water of the engine.

The above vehicle-use combination meter has a meter casing to accommodate movements of the above meters, character plates arranged on the front face of the above meter casing, pointers, and an inside-cover plates arranged in front of the character plates. Each movement has an output shaft to rotate according to the measuring quantity. The pointer is attached to the output shaft of the movement.

The above character plates are a speedometer character plate, a tachometer character plate, a fuel gauge character plate, and a temperature gauge character plate. These character plates are made of synthetic resin. A vehicle speed indication scale, an engine rotation speed indication scale, a fuel remaining quantity indication scale, and a cooling water temperature indication scale are provided on the respective character plates.

The output shafts of the movements turns according to corresponding information (measuring quantities) from the respective measuring means. And, the pointers turn on respective indicating portions. Like this, the vehicle-use combination meter indicates measuring quantities to the crew.

With respect to the above prior art, however, the character plates are made synthetic resin. Therefore, the high-grade feeling thereof is fairly low in comparison with other onboard devices when installed on a high-grade motor vehicle. Therefore, it is suggested the character plate is formed of metal. However, the measuring quantity of the meter unit shall be easily recognized by the crew for safety even in the night. When the character plate is made of metal, it is difficult to make the scale or the like shine.

SUMMARY OF THE INVENTION

In view of the foregoing, an object of the present invention is to provide a meter apparatus and a character plate thereof which can give a crew a high-grade feeling and make the crew easily recognize the measuring quantity.

In order to achieve the above object, as a first aspect of the present invention, a meter apparatus comprises: a meter casing; a meter unit accommodated in the meter casing and having an output shaft to rotate according to a measuring quantity showing a state of a moving body; a pointer attached to the output shaft; and a character plate having indicating portions to indicate a state of the moving body by indicating the measuring quantity by means of the pointer, wherein the character plate has a plate member made of metal and provided with a first indicating portion of the indicating portions on a first surface facing a crew of the moving body, and there is provided a lighting means attached to the meter casing, arranged nearer the crew of the moving body than the character plate, and illuminating the first surface of the plate member of the character plate.

As a second aspect of the present invention, based on the first aspect, a morning sun expression is formed on the first surface of the plate member.

As a third aspect of the present invention, based on the first aspect, one of the first indicating portion and the first surface of the plate member is painted with a dark color paint, and the other is painted with a light color paint.

As a fourth aspect of the present invention, based on the first aspect, the first surface of the plate member is frosted.

As a fifth aspect of the present invention, based on the first aspect, the character plate has a framing member attached to a periphery of the plate member and provided with a second indicating portion of the indicating portions on a second surface facing the crew of the moving body, and the lighting means can illuminate the second surface of the framing member.

As a sixth aspect of the present invention, based on the fifth aspect, one of the second surface of the framing member and the second indicating portion is a dark color, and the other is a light color.

As a seventh aspect of the present invention, a character plate of a meter apparatus comprises: indicating portions to indicate a measuring quantity by a pointer attached to an output shaft of a meter unit so that a state of a moving body can be shown, the output shaft rotating according to the measuring quantity; and a plate member having a first indicating portion of the indicating portions on a first surface facing a crew of the moving body, wherein the plate member is made of metal and a morning sun expression is formed on the first surface.

As an eighth aspect of the present invention, a character plate of a meter apparatus comprises: indicating portions to indicate a measuring quantity by a pointer attached to an output shaft of a meter unit so that a state of a moving body can be shown, the output shaft rotating according to the measuring quantity; and a framing member made of light-transmissible material, formed in a frame-like shape, and provided with a second indicating portion of the indicating portions on a second surface facing the crew of the moving body, wherein a metal layer is overlaid on the second surface and grooves extending in a circumferential direction of the framing member are formed on a surface of the metal layer.

As a ninth aspect of the present invention, a character plate of a meter apparatus comprises: indicating portions to indicate a measuring quantity by a pointer attached to an output shaft of a meter unit so that a state of a moving body can be shown, the output shaft rotating according to the measuring quantity; a plate member having a first indicating portion of the indicating portions on a first surface facing a crew of the moving body; and a framing member made of light-transmissible material, formed in a frame-like shape, provided with a second indicating portion of the indicating portions on a second surface facing the crew of the moving body, and attached to a periphery of the plate member, wherein the plate member is made of metal, a morning sun expression is formed on the first surface, and wherein a metal layer is overlaid on the second surface and grooves extending in a circumferential direction of the framing member are formed on a surface of the metal layer.

As a tenth aspect of the present invention, based on the seventh or ninth aspect, one of the first indicating portion and the first surface of the plate member is painted with a dark color paint and the other is painted with a light color paint.

As an eleventh aspect of the present invention, based on the seventh or ninth aspect, the first surface of the plate member is frosted.

As a twelfth aspect of the present invention, based on the eighth or ninth aspect, one of the surface of the metal layer and the second indicating portion is a dark color and the other is a light color.

According to the above-described structures of the present invention, the following advantages are provided.

(1) According to the first aspect of the invention, the lighting means is arranged nearer the crew than the character plate. Therefore, the lighting means can illuminate the whole surface of the plate member including the indicating portion. Therefore, the crew can easily recognize the measuring quantity on the first indicating portion indicated by the pointer. And, the plate member of the character plate is made of metal. Therefore, a feeling of metal can be given to the crew with the reflection of the light from the character plate. Therefore, a high-grade feeling can be given to the crew even in the night.

(2) According to the second aspect of the invention, because the morning sun expression is formed on the surface, facing the crew, of the plate member, the crew can easily recognize the measuring quantity and a high-grade feeling can be given to the crew even in the night with the reflection of the light.

(3) According to the third aspect of the invention, either the first indicating portion or the surface of the plate member is painted with a dark color paint, and the other is painted with a light color paint. Therefore, the contrast between the above first indicating portion and the surface of the plate member is large. Therefore, a high-grade feeling can be given to the crew, and the crew can easily recognize the first indicating portion. Therefore, the visibility of the crew is improved.

(4) According to the forth aspect of the invention, the surface of the plate member is frosted. Therefore, the contrast between the above first indicating portion and the surface of the plate member is large. And, it can be prevented that the crew can not recognize the first indicating portion due to the strong light reflected from the character plate. Therefore, beside the high-grade feeling, the crew can still easily recognize the measuring quantity. Therefore, the visibility of the crew is further improved.

(5) According to the fifth aspect of the invention, the lighting means illuminates the surface of the framing member. Therefore, the crew can securely recognize the measuring quantity on the second indicating portion.

(6) According to the sixth aspect of the invention, either the surface of the framing member or the second indicating portions is a dark color, and the other is a light color. Therefore, the surface of the above framing member and the second indicating portion is large. Therefore, the crew can securely recognize the measuring quantity on the second indicating portion.

(7) According to the seventh aspect of the present invention, because the morning sun expression is provided on the surface, facing the crew, of the plate member, the feeling of metal can be given to the crew with the reflection of the light. Therefore, a high-grade feeling can be given to the crew.

(8) According to the eighth aspect of the present invention, the metal layer is overlaid on the second surface of the framing member and the grooves are formed on the metal layer. Therefore, the feeling of metal can be given to the crew with the reflection of the light, and a high-grade feeling can be given to the crew. And, because the metal layer is not formed on the second indicating portion, the second indicating portion can be brightened. Therefore, the second indicating portion can be easily recognized. That is, the visibility with the crew can be improved.

(9) According to the ninth aspect of the present invention, the morning sun expression is provided on the surface, facing the crew, of the plate member; and the metal layer is formed on the second surface of the framing member. And, the grooves are formed on the metal layer. Therefore, the feeling of metal can be given to the crew with the reflection of the light, and a high-grade feeling can be given to the crew. And, because the metal layer is not formed on the second indicating portion, the second indicating portion can be brightened. Therefore, the second indicating portion can be easily recognized. That is, the visibility with the crew can be improved.

(10) According to the tenth aspect of the present invention, either the first indicating portion or the surface of the plate member is painted with a dark color paint, and the other is painted with a light color paint. Therefore, the contrast between the first indicating portion and the surface of the plate member is large. Therefore, the crew can easily recognize the first indicating portion. Therefore, a high-grade feeling can be given to the crew, and the visibility with the crew can be improved.

(11) According to the eleventh aspect of the present invention, the surface of the plate member is frosted. Therefore, the contrast between the first indicating portion and the surface of the plate member is larger. And, it can be prevented that the crew cannot recognize the first indicating portion caused by the strong reflected light from the character plate. Therefore, the crew can more easily recognize the first indicating portion. Therefore, a high-grade feeling can be given to the crew, and the visibility with the crew can be further improved.

(12) According to the twelfth aspect of the present invention, either of the surface of the metal layer and the second indicating portions is a light color, and the other is a dark color. Therefore, the contrast between the second indicating portion and the surface of the metal layer is large. Therefore, the crew can easily recognize the second indicating portion. Therefore, a high-grade feeling can be given to the crew, and the visibility with the crew can be further improved.

The above and other objects and features of the present invention will become more apparent from the following description taken in conjunction with the accompanying drawings.

DESCRIPTION OF THE PREFERRED EMBODIMENT(S)

Embodiment(s) of the present invention will now be described in further detail with reference to FIG. 1 to FIG. 12.

Figure 1:
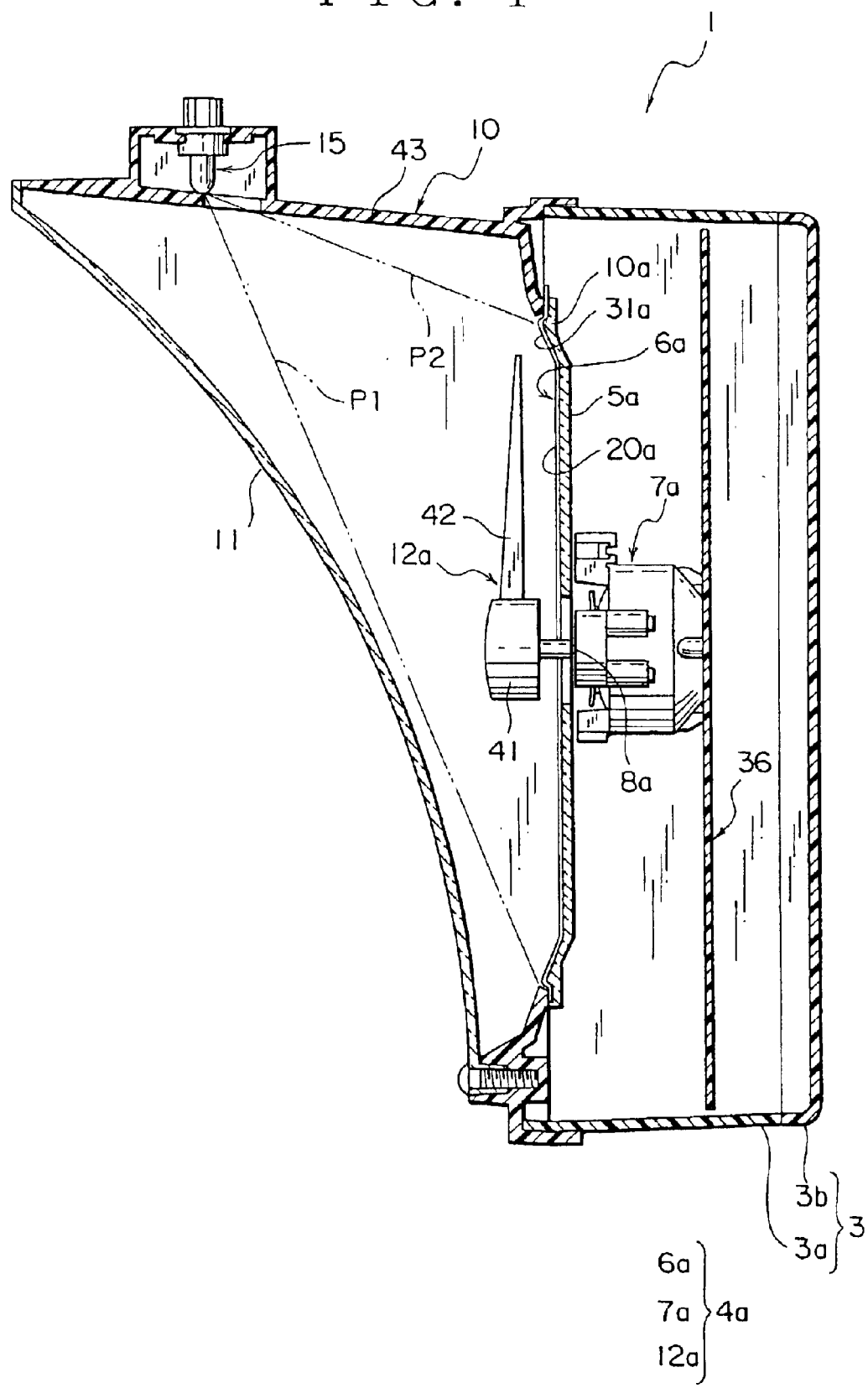
FIG. 1 is a sectional view of an embodiment of an inventive vehicle-use combination meter as a meter apparatus.

An inventive vehicle-use combination meter 1 as a meter apparatus shown in FIG. 1 is mounted on a moving body such as a motor vehicle to indicate a state of the moving body for a crew thereof. The vehicle-use combination meter 1 has a casing 3 as a meter casing, an indicator 4, an inside-cover plate 10, and a transparent cover 11. And, an inventive character plate of the meter apparatus is used for the vehicle-use combination meter 1.

The casing 3 has a frame portion 3a and a bottom plate portion 3b. The frame portion 3a is formed in a frame-like shape. The bottom plate portion 3b is tabularly formed. The frame portion 3a is attached to the periphery of the bottom plate portion 3b thereby to assemble the casing. The casing 3 is formed in a box-shape with an opening portion 3c facing the crew of the moving body.

In the casing 3, later-described movements 7a,7b,7c,7d, a bulb as a light source for the character plate, and another bulb as a light source for the pointer are accommodated. Further, in the casing 3, a printed board 36 electrically connected to the movements 7a,7b,7c,7d and the bulbs are accommodated. This printed board 36 is a hard substrate, on which electronic parts such as a microcomputer controlling the movements 7a,7b,7c,7d and so no are implemented.

The indicator 4 consists of a speedometer 4a to indicate the speed of a vehicle, a tachometer 4b to indicate the rotation speed of an engine, a fuel gauge 4c to indicate the remaining quantity of the fuel, and a temperature gauge 4d to indicate the temperature of the cooling water of the engine.

The speedometer 4a consists of the movement 7a as a meter unit, a pointer 12a, and a vehicle speed indication character plate 6a as a character plate of the meter apparatus. The tachometer 4b consists of the movement 7b as a meter unit, a pointer 12b, and an engine rotation-speed indication character plate 6b as the character plate of the meter apparatus.

The fuel gauge 4c consists of the movement 7c as a meter unit, a pointer 12c, and a fuel remaining quantity indication character plate 6c as the character plate of the meter apparatus. The temperature gauge 4d consists of the movement 7d as a meter unit, a pointer 12d, and a cooling water temperature indication character plate 6d as the character plate of the meter apparatus. These character plates 6a,6b,6c,6d are arranged in the opening portion 3c of the casing 3. Detailed structures of these character plates 6a,6b,6c,6d are described later.

The movements 7a,7b,7c,7d are connected with a non-shown vehicle speed detecting means, an engine rotation speed detecting means, a fuel remaining quantity detecting means, and a cooling water temperature detecting means, respectively. The movements 7a,7b,7c,7d have respective output shafts 8a,8b,8c,8d to rotate according to the measuring quantities detected by the above detecting means.

The pointers 12a,12b,12c,12d are formed of light-transmissible material such as acrylic resin. Here, the pointers 12a,12b,12c,12d have the same form and structure. Therefore, the pointer 12a for the speedometer 4a is described representatively hereinafter.

Figure 3:
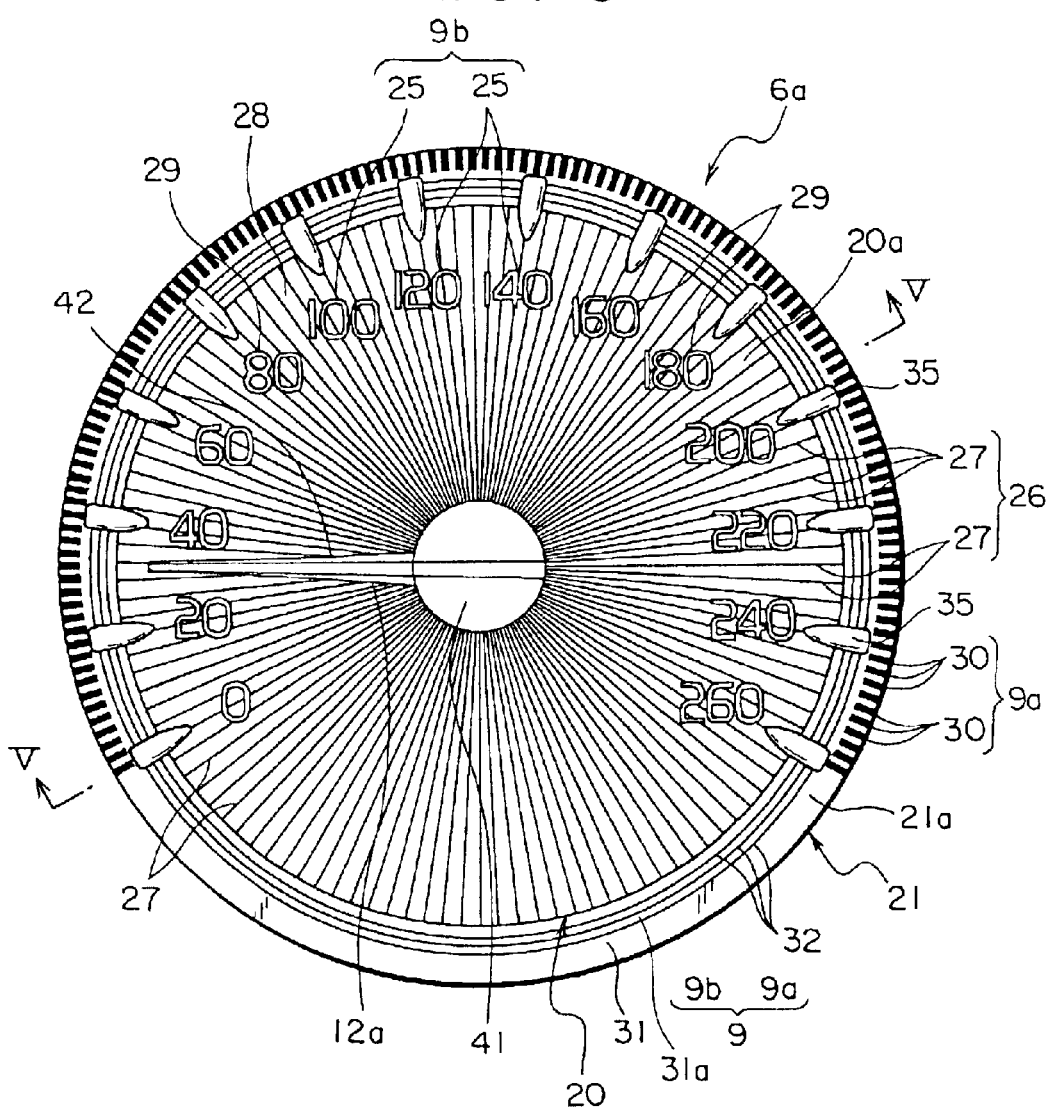
FIG. 3 is a front view showing an embodiment of an inventive vehicle speed indication character plate.

The pointer 12a, as shown in FIG. 3, has a proximal end portion 41 and an indicating portion 42 radially extending from the proximal end portion 41. The proximal end portion 41 is formed in a disc-shape. The proximal end portion 41 has a non-shown light-receiving portion, where the light from the above bulb enters. The light-receiving portion reflects the above light toward the distal end of the indicating portion 42. The indicating portion 42 is formed generally conically.

The proximal end portion 41 of the pointer 12a is attached to the output shaft 8a of the movement 7a. The pointer 12a is attached in a state that the proximal end portion 41 is positioned in the central portion of the vehicle speed indication character plate 6a as shown in FIG. 3.

The pointers 12a,12b,12c,12d joined with the respective output shafts 8a,8b,8c,8d of the movements 7a,7b,7c,7d rotate or turn. The pointers 12a,12b,12c,12d are turned by the movements 7a,7b,7c,7d according to the measuring quantities measured by the respective measuring means and indicate the measuring quantities while coworking later-described scales 9a,9b of the character plates 6a,6b,6c,6d. The indicating portions 42 of the above pointers 12a,12b, 12c,12d can shine by the light entering a light-receiving portion of the proximal end portion 41 from the bulb.

The pointers 12a,12b,12c,12d indicate values of the scales 9a,9b, namely the indicating portion, of the character plates 6a,6b,6c,6d to show the crew a state of the motor vehicle.

The inside-cover plate 10 is attached to the frame portion 3a forming the opening portion 3c of the casing 3. The inside-cover plate 10 has a speedometer exposing window 10a exposing the character plates 6a,6b,6c,6d to the crew, a tachometer exposing window 10b, a non-shown fuel gauge exposing window, and a temperature gauge exposing window 10d. The casing 3 and the inside-cover plate 10 constitute the meter casing.

The transparent cover 11 is formed in a plate-like shape by molding transparent resin. The transparent cover 11 is attached to the casing 3 while closing the opening portion 3c of the above casing 3. The transparent cover 11 prevents the dust and the like from invading into the vehicle-use combination meter 1.

Since the above character plates 6a,6b,6c,6d have generally the same structure, the vehicle speed indication character plate 6a is representatively describe hereinafter. The vehicle speed indication character plate 6a is formed in a disc-shape as shown in FIG. 3. As shown in FIG. 3, the vehicle speed indication character plate 6a has a circular-tabular plate member 20, a ring-like (i.e. frame-like) framing member 21, and a second framing member 22 being ring-like.

Figure 4:
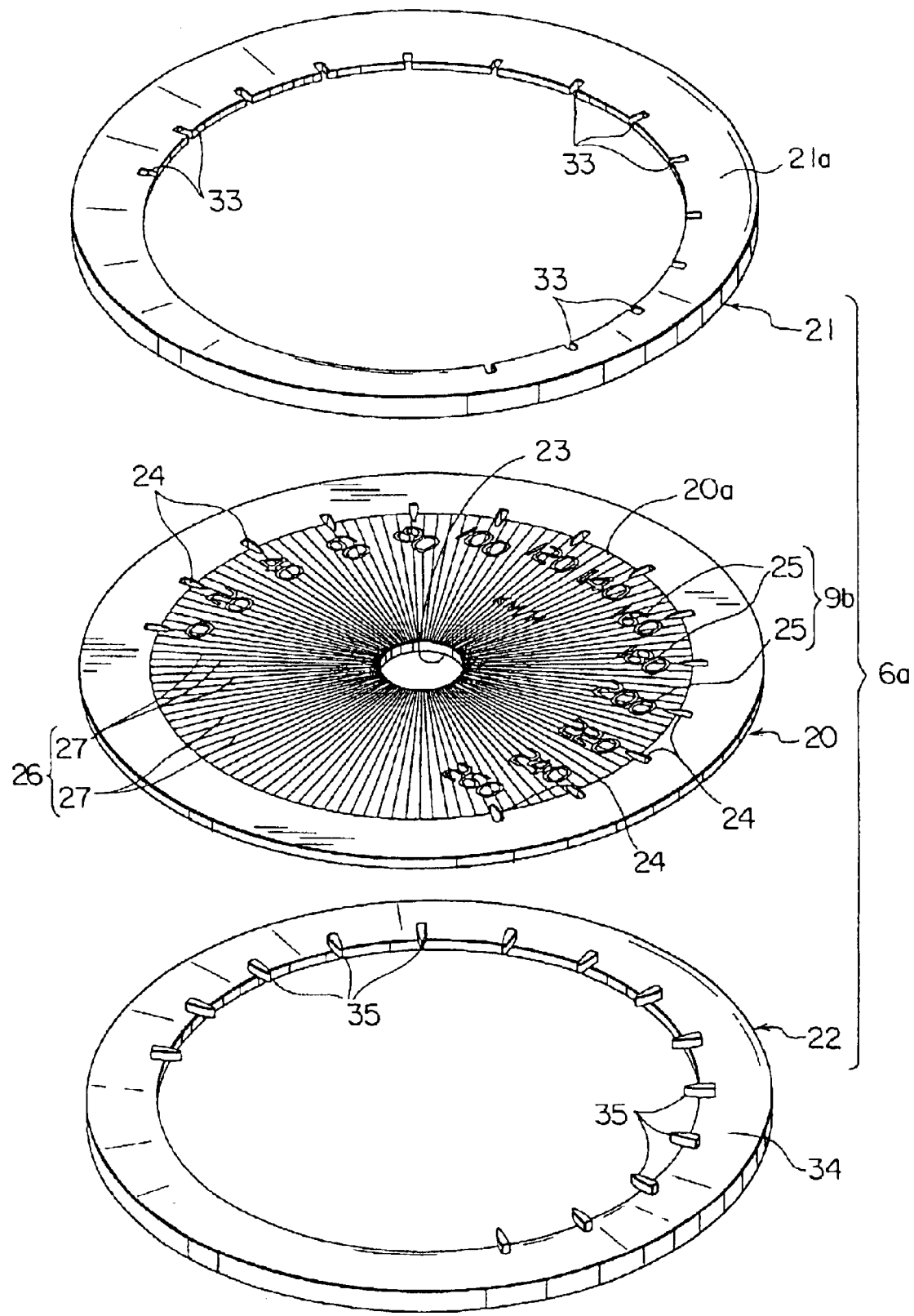
FIG. 4 is an exploded perspective view of the vehicle speed indication character plate shown in FIG. 3.

The plate member 20 is made of metal. The plate member 20 is provided with a hole 23 centrally, as shown in FIG. 4, and bullet scale putting-through holes 24 at the peripheral portion. The hole 23 puts the output shaft 8a of the movement 7a and the light emitted from the bulb therethrough. The bullet scale putting-through hole 24 corresponds to an external shape of a later-described bullet scale 35. The bullet scale putting-through holes 24 are circumferentially arranged on the plate member 20 at uniform intervals.

Figure 11:
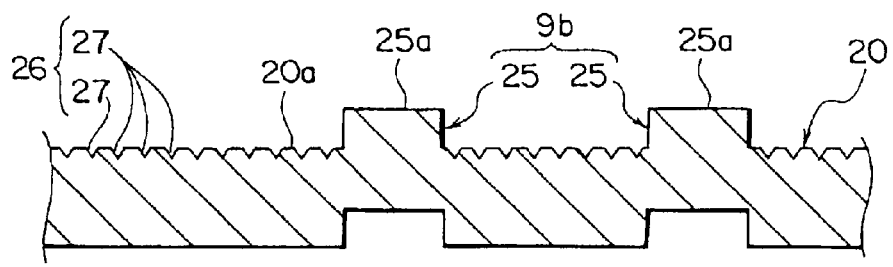
FIG. 11 is a sectional view showing a state that numerals and grooves are formed on the plate member shown in FIG. 10.
Figure 12:
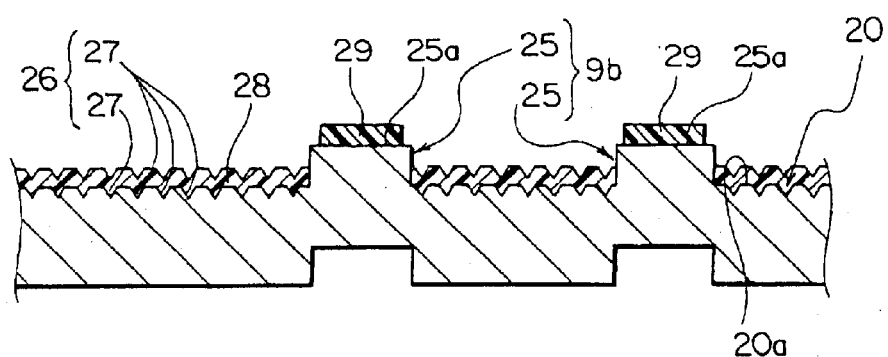
FIG. 12 is a sectional view showing a state that a paint is put on the surfaces of the numerals and the surface of the plate member shown in FIG. 11.

On the surface 20a, facing the crew, of the plate member 20, a numerical scale 9b as a first indicating portion is provided. The numerical scale 9b has numerals 25 circumferentially provided on the plate member 20 at uniform intervals. As shown in FIG. 11 and FIG. 12, each numeral 25 projects from the surface 20a toward the crew.

Here, the numerals 25 of the numerical scale 9b of the vehicle speed indication character plate 6a show the speed of a motor vehicle. The numerical scale 9b of the engine rotation-speed indication character plate 6b shows the rotation speed of an engine. The numerical scale 9b of the fuel remaining quantity indication character plate 6c shows the remaining quantity of the fuel. The numerical scale 9b of the cooling water temperature indication character plate 6d shows the temperature of the cooling water.

On the surface 20a except for the numerals 25 of the above numerical scale 9b, a morning sun expression 26 is formed. This morning sun expression 26 is made up of a plurality of grooves 27. The cross-section of the grooves 27 is shown in FIG. 11 and FIG. 12. As shown in FIG. 4, the grooves 27 are arranged radially from the hole 23 toward the periphery of the plate member 20 at uniform intervals.

Here, the above grooves 27 are shown in FIGS. 3,4 larger than desirable ones. The desirable or actual grooves have smaller width, smaller depth, and smaller intervals in such a manner that the grooves is not recognized.

Further, either the surfaces 25a (shown in FIG. 5 and FIG. 11) of the numerals 25 of the numerical scale 9b or the surface 20a except the surfaces 25a is painted with a dark color paint 28 (shown in FIG. 5 and FIG. 12), and the rest is painted with a light color paint 29.

In the illustrated embodiment, the dark color paint 28 such as black, blue, or green is painted on the surface 20a except the surfaces 25a of the numerals 25. The light color paint 29 such as white, yellow, or silver is painted on the surfaces 25a of the numerals 25. And, flatting agents checking the glossiness is put in the dark color paint 28. Otherwise, flatting agents is painted on the surface of the dark color paint 28.

Here, the light color paint 29 such as white or yellow may be painted on the surface 20a except the surfaces 25a of the numerals 25. On the surfaces 25a of the numerals 25, the dark color paint 28 such as black, blue, or green may be painted. In this case, it is desirable to put the flatting agent in the light color paint 29. Otherwise, it is desirable to paint the flatting agents on the surface of the light color paint 29.

Figure 10:
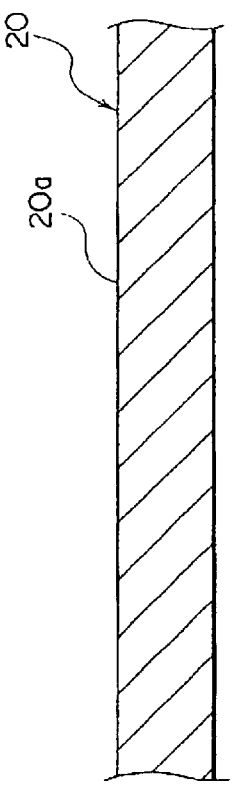
FIG. 10 is a sectional view showing a state that a plate member of the vehicle speed indication character plate shown in FIG. 3 has no numeral.

The plate member 20 with the above-described structure is obtained through a process shown in FIG. 10 to FIG. 12. First, the stamping is made to a flat metal plate to form the plate member 20 as shown in FIG. 10. Subsequently, the press working is carried out in order to make the numerals 25 of the numerical scale 9b project from the surface 20a as shown in FIG. 11. And, the machining is carried out to form the grooves 27 of the morning sun expression 26 shown in FIG. 11. And, as shown in FIG. 12, the light color paint 29 is put on the surfaces 25a of the numerals 25 of the above numerical scale 9b, and the dark color paint 28 is put on the surface 20a except the numerals 25 of the numerical scale 9b. Like this, the plate member 20 with the above-described structure is obtained.

The framing member 21 is made of light-transmissible material such as light-transmissible synthetic resin. The framing member 21 is attached to the periphery of the plate member 20 around the portion with the above morning sun expression The framing member 21 is put on the surface 20a of the plate member 20.

Figure 5:
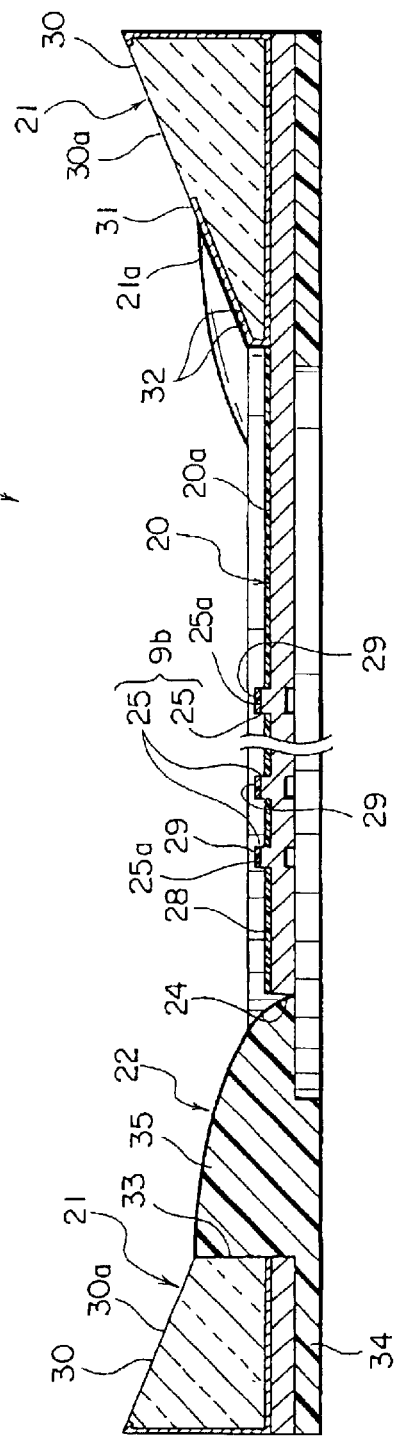
FIG. 5 is a sectional view taken along a line V—V in FIG. 3.

The second surface 21a, facing the crew, of the framing member 21 slants as shown in FIG. 5. On the peripheral portion of the second surface 21a, the peripheral scale 9a as a second indicating portion showing a state of a motor vehicle is provided. The peripheral scale 9a, as shown in FIG. 3, has indication projections 30 each having a rectangular plan view and radially arranged.

Figure 6:
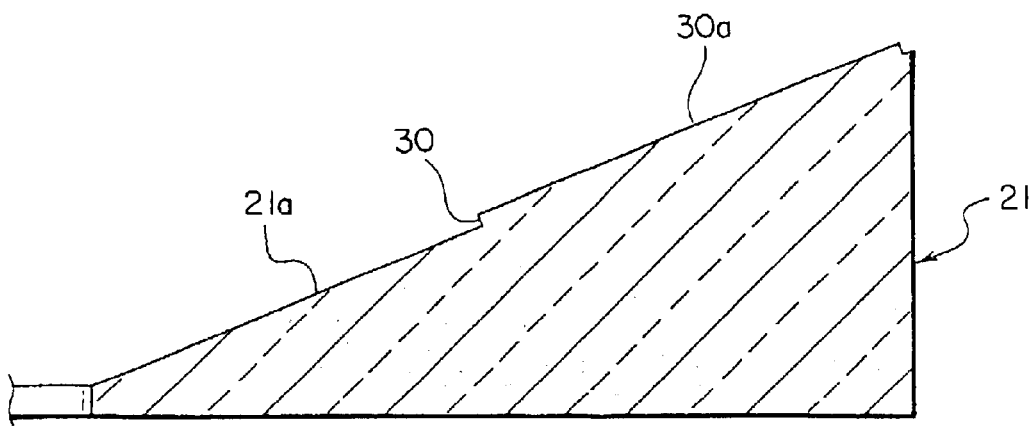
FIG. 6 is a sectional view showing a framing member of the vehicle speed indication character plate shown in FIG. 3, which framing member is molded from a light-transmissible material.

Here, the peripheral scale 9a is omitted from FIG. 4. The indication projections 30 of the peripheral scale 9a project from the second surface 21a toward the crew as shown in FIG. 5 and FIG. 6. The surface 30a of the indication projection 30 is parallel to the second surface 21a as shown in FIG. 6. The indication projections 30 is circumferentially arranged at uniform intervals.

Here, the peripheral scale 9a and the numerical scale 9b constitute the vehicle speed indication scale 9.

The metal layer 31 (FIG. 5 and FIG. 9) is overlaid on the whole outside surface, except the surfaces 30a of the above indication projections 30, of the framing member 21. That is, the metal layer 31 is overlaid on the second surface 21a except the surfaces 30a of the indication projections 30. The ring grooves 32 are coaxially formed on the metal layer 31 as shown in FIG. 3 and FIG. 9.

Here, in the figures the grooves 32 are enlarged larger than the desirable or actual ones. The width, depth and an interval of the desirable or actual grooves 32 are very small in such a way that the grooves 32 are difficult to be recognized. Therefore, the grooves 32 are formed more than shown in FIG. 3.

And, bullet scale putting-through holes 33 are provided on the inside edge portion of the framing member 21 as shown in FIG. 4. The form of the bullet scale putting-through hole 33 corresponds to that of the bullet scale 35. The bullet scale putting-through holes 33 are circumferentially arranged on the framing member 21 at uniform intervals. When the framing member 21 are attached to the plate member 20, the bullet scale putting-through holes 24,33 agree.

Figure 7:
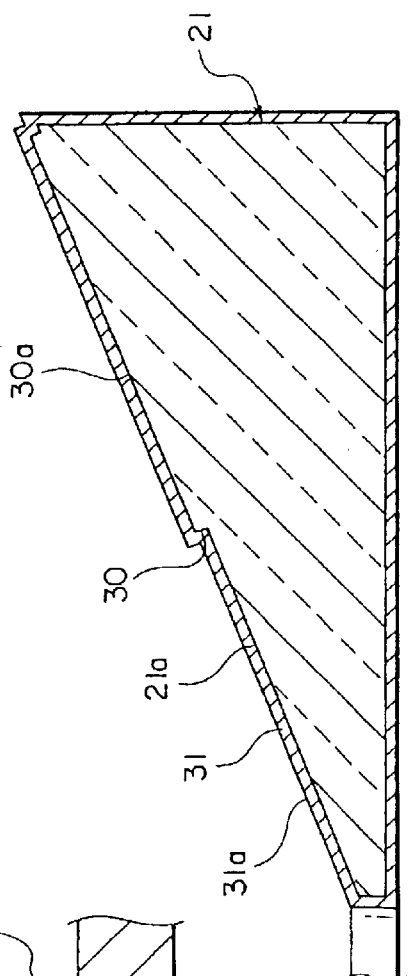
FIG. 7 is a sectional view showing a state that a metal layer is overlaid on an outside surface of the framing member shown in FIG. 6.
Figure 8:
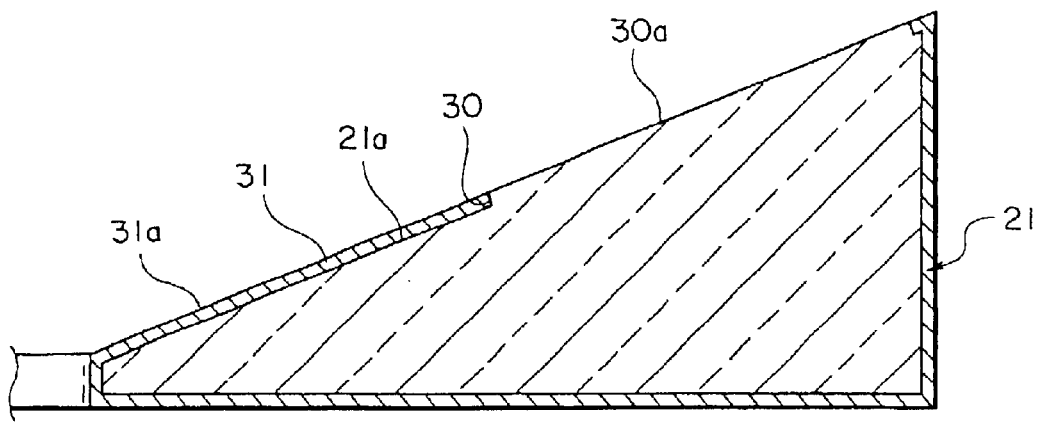
FIG. 8 is a sectional view showing a state that the metal layer has been removed from the surface of an indication projection of the framing member shown in FIG. 7.
Figure 9:
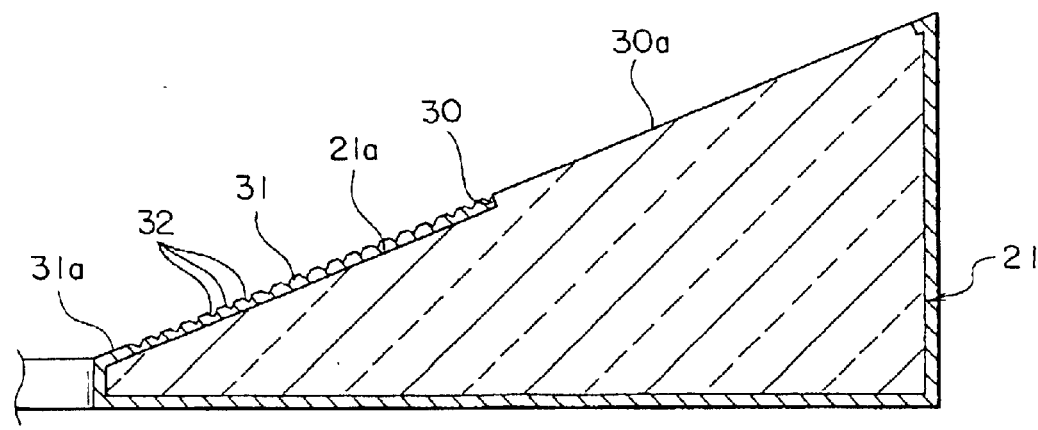
FIG. 9 is a sectional view showing a state that grooves are formed on the metal layer of the framing member shown in FIG. 8.

The framing member 21 of the above structure is obtained through processes shown in FIG. 6 to FIG. 9. First, as shown in FIG. 6, the light-transmissible synthetic resin is molded in a desirable shape. Successively, as shown in FIG. 7, the above metal layer 31 is overlaid on the whole outside surface of the framing member 21 by means of the vapor coating or the plating. As shown in FIG. 8, the metal layer 31 on the surfaces 30a of the above indication projections 30 are removed by the machining. Successively, as shown in FIG. 9, the above grooves 32 are formed with the machining on the surface 31a of the metal layer 31 of the second surface 21a. Like this, the above framing member 21 is obtained. Here, FIG. 6 to FIG. 9 show radial section of the framing member 21.

The second framing member 22 has a circular ring portion 34 and the bullet scales 35 as shown in FIG. 4. The bullet scales 35 project from the circular ring portion 34 toward the crew. At least the bullet scale 35s of the second framing member 22 are formed by the electroforming manufacturing. Otherwise, the base material of the second framing member 22 may be molded from synthetic resin, and the metal layer may be formed on the surface of the bullet scales 35 by the plating or the vapor coating.

The above speed indication character plate 6a is obtained by putting the plate member 20 on the circular ring portion 34 of the second framing member 22 and putting the framing member 21 on the peripheral portion of the plate member 20. At this time, the bullet scales 35 go through the bullet scale putting-through holes 24,33 and are exposed on the surface 20a side. That is, the bullet scales 35 are exposed to the crew.

When the vehicle speed indication character plate 6a is assembled, either the light-transmissible synthetic resin forming the framing member 21 or the surface 31a of the above metal layer 31 is a dark color such as black, blue, or green, and the other is a light color such as white, yellow, or silver. In the illustrated embodiment, the surface 31a of the metal layer 31 is a light color, and the synthetic resin forming the framing member 21 is a dark color. Specifically, the surface 31a of the metal layer 31 is silver, and the synthetic resin forming the framing member 21 is thin black. Otherwise, the surface 31a of the metal layer 31 may be a dark color, and the synthetic resin forming the framing member 21 may be a light color.

Since the above framing member 21 is made of light-transmissible synthetic resin and the surfaces 30a of the indication projections 30 of the peripheral scale 9a are exposed, the indication projections 30 of the peripheral scale 9a shine due to the light from the bulb transmitted by the dial-use light-transmissible plate 5. The character plates 6b,6c,6d are provided with respective scales, which correspond to the above vehicle speed indication scale 9, on the surfaces. That is, the engine rotation speed, the remaining quantity of the fuel, and the temperature of the cooling water are indicated. Here, these scales each also have the peripheral scale 9a and the numerical scale 9b.

Figure 2:
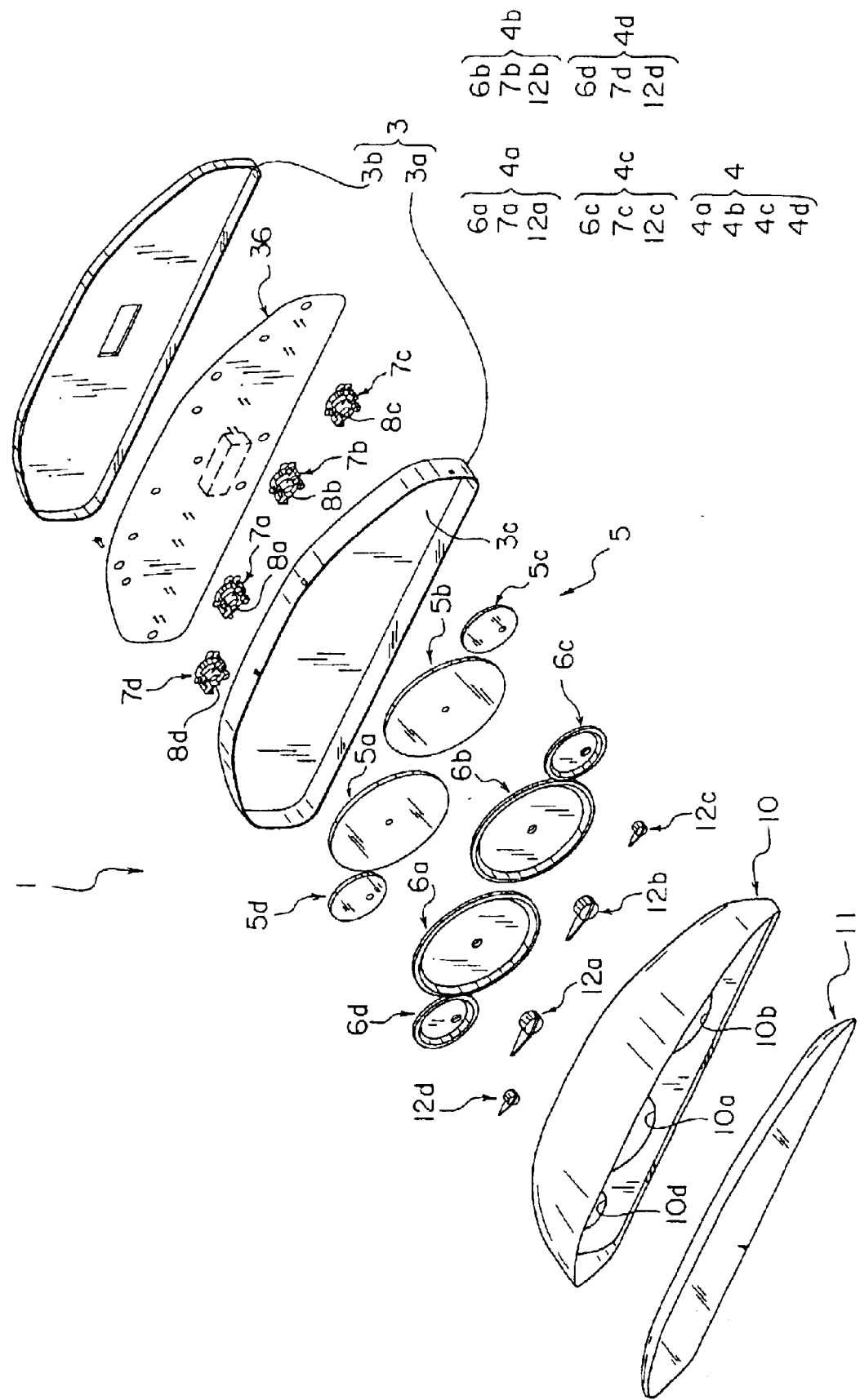
FIG. 2 is an exploded perspective view of the vehicle-use combination meter shown in FIG. 1.

As shown in FIG. 2, the dial-use light-transmissible plate 5 includes a speed-use light-transmissible plate 5a, an engine speed-use light-transmissible plate 5b, a fuel remaining quantity-use light-transmissible plate 5c, and a cooling water temperature-use light-transmissible plate 5d. These light-transmissible plates 5a,5b,5c,5d are provided correspondingly to the respective character plates 6a,6b,6c,6d. The light-transmissible plates 5a,5b,5c,5d are arranged between the respective character plates 6a,6b,6c,6d and the bulb for the character plate. The light-transmissible plates 5a,5b,5c,5d lead the light from the bulb to the peripheral scales 9a of the character plates 6a,6b,6c,6d in order to brighten the indication projections 30 of the peripheral scales 9a.

With the character plates 6a,6b,6c,6d, the scales 9a,9b are pointed by the respective indicating portions 42 of the pointers 12a,12b,12c,12d joined to the output shafts 8a,8b,8c,8d of the movements 7a,7b,7c,7d thereby to indicate the above measuring quantities. The character plates 6a,6b,6c,6d cowork with the pointers 12a,12b,12c,12d so as to indicate a state of a motor vehicle.

And, a vehicle-use combination meter 1 has a bulb 15 as a lighting means as shown in FIG. 1. The meters 4a,4b and the gauges 4c,4d each are provided with at least one bulb 15. The bulb 15 is attached to the ceiling wall 43 of the inside-cover plate 10 as shown in FIG. 1. The ceiling wall 43 is arranged generally horizontally. The bulb 15 is attached to the above ceiling wall 43 in a state that the bulb 15 can illuminate the inside of the vehicle-use combination meter 1. Therefore, the bulb 15 is arranged nearer the crew than the character plates 6a, 6b,6c,6d.

And, the bulb 15 emits the light between the two-dot chain lines P1 and P2 in FIG. 1. The bulb 15 can illuminate the whole surface 20a of the plate member 20 of the character plates 6a,6b,6c,6d and the whole surface 31a of the metal layer 31 of the framing member 21. The bulb 15 is controlled by a microcomputer or the like attached to the above-described printed board 36.

According to the present embodiment, the bulbs 15 are arranged nearer the crew than the character plates 6a,6b,6c, 6d. The plate member 20 is made of metal, and the metal layer 31 is overlaid on the second surface 21a of the framing member 21. Therefore, the emitted light from the above bulbs 15 is reflected at the above surfaces 20a,31a toward the crew.

Therefore, when the bulb 15 turns on, the crew can recognize the whole surfaces 20a,31a. Therefore, the crew can easily recognize the measuring quantities on the scales 9a,9b indicated by the respective pointers 12a,12b,12c,12d.

In the present embodiment, the plate member 20 is made of metal. And, the morning sun expression 26 is provided on the surface 20a, of the plate member 20, except for the numerals 25 of the numerical scale 9b. Therefore, the feeling of metal can be given to the crew of a motor vehicle with the reflection from the surface 20a of the plate member 20. Accordingly, the character plates 6a,6b,6c,6d can give a high-grade feeling to the crew.

The metal layer 31 is overlaid on the second surface 21a except for the indication projections 30 of the peripheral scale 9a of the framing member 21. The coaxial ring grooves 32 are formed on the surface 31a of the above metal layer 31. Therefore, the feeling of metal can be given to the crew of a motor vehicle with the reflection from the second surface 21a of the framing member 21. Accordingly, the character plates 6a,6b,6c,6d can give a high-grade feeling to the crew. Further, in the present invention, the surfaces 25a of the numerals 25 of the numerical scale 9b is plated with rhodium or the like and the light color paint 29 may be painted. In this case, a feeling of metal and therefore a high-grade feeling can be given to the crew.

Further, the surfaces 25a of the numerals 25 of the numerical scale 9b are painted with the light color paint 29, and the surface 20a except for the numerals 25 of the numerical scale 9b is painted with the dark color paint 28. Therefore, the contrast between the numerical scale 9b and the surface 20a is large. And, the crew of a motor vehicle can easily recognize the numerals 25 of the above numerical scale 9b at a glance.

And, the surface 20a except for the numerals 25 of the numerical scale 9b is frosted. Therefore, the contrast between the numerical scale 9b and the surface 20a is larger. Then, even if the relatively strong light of evening sun directly shines on the surface 20a of the plate member 20 for example, the intensity of the light reflected from the surface 20a can be reduced.

Further, the surface 31a of the metal layer 31 overlaid on the second surface 21a of the framing member 21 is a light color, and the indication projections 30 of the peripheral scale 9a is a dark color. Therefore, the contrast between the indication projections 30 of the surface 31a and the peripheral scale 9a of the metal layer 31 is large. Therefore, the crew of a motor vehicle can easily recognize the indication projections 30 of the above peripheral scale 9a.

In the above-described embodiment, the indication projections 30 shine by removing the metal layer 31 from the surfaces 30a of the indication projections 30 after overlaying the metal layer 31 on the framing member 21. However, the metal layer 31 may be removed from the surfaces 30a of the indication projections 30 by the laser after overlaying the metal layer 31 on the framing member 21.

And, the half coating may be applied on the surfaces 30a of the above indication projections 30. Here, with this half coating the light only goes from the indication projections 30 toward the crew. Further, the holes to put the above indication projections 30 through may be formed on a metal plate corresponding to the above metal layer 31, and the metal plate is put on the framing member 21 while exposing the indication projections 30 from the above holes so that the indication projections 30 can shine.

In above-described embodiment, the numerals 25 of the numerical scale 9b of the plate member 20 project from the surface 20a of the plate member 20, and the numerals 25 is not brightened. However, in the present invention, the numerals 25 of the above numerical scale 9b may be brightened by using the means shown below.

The numerals 25 of the numerical scale 9b of the plate member 20 are formed with holes by the stamping or etching. And, the numerals 25 are brightened by making the light from the above dial-use light-transmissible plate 5 go through the above hole. And, the character plates 6a,6b,6c, 6d are formed by the evaporation, plating, or painting the above dial-use light-transmissible plate 5. Subsequently, holes along the numerals 25 of the numerical scale 9b are formed on the above character plates 6a,6b,6c,6d by means of the laser. Like this, the numerals 25 are brightened by the light from the above dial-use light-transmissible plate 5.

In the present invention, the LED (Light Emitting Diode) may be used as the lighting means. In the present embodiment, the character plates 6a,6b,6c,6d are lighted up by using the bulb 15, and the indication projections 30 of the peripheral scale 9a are brightened by using the bulb for the character plate. However, in the present invention, the character plates 6a,6b,6c,6d may be lighted up by using the bulb 15 only.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A meter apparatus, for viewing by a crew of a moving body; the meter apparatus comprising:
    a pointer attached to an output shaft of a meter unit to show a state of the moving body, the output shaft rotating according to the measuring quantity; and a character plate further comprising:
    a plate member including first indicating marks, on a first surface of the plate member facing the crew of the moving body, to be indicated by the pointer; and
    a framing member comprising light-transmitting material, the framing member including second indicating marks on a second surface surrounding the plate member and facing the crew of the moving body,
    wherein a metal layer is coated on portions of the second surface and the second indicating marks comprise areas of the light transmitting material surrounded by areas of the metal layer, whereby light inside the framing member is reflected by the metal layer and the light escapes from the framing member through the second indicating marks; and
    lighting means for illuminating the areas of the light transmitting material comprised in the second indicating marks.

2. The meter apparatus as set forth in claim 1, wherein the plate member comprises metal, radial grooves are formed on the first surface, and
    the second surface comprises circumferential grooves extending in a circumferential direction of the framing member formed on a surface of the metal layer.

3. The meter apparatus as set forth in claim 1 or claim 2, wherein
    one of the first indicating marks and the first surface of the plate member is painted with a dark color paint and the other is painted with a light color paint.

4. The meter apparatus as set forth in claim 1 or claim 2, wherein the first surface of the plate member is frosted.

5. The meter apparatus as set forth in claim 1 or claim 2, wherein
    one of the surface of the metal layer and the second indicating marks is a dark color and the other is a light color.

6. The meter apparatus according to claim 2, wherein the radial grooves have a small width, depth, and/or interval such that the grooves are not recognizable as such.

7. The meter apparatus according to claim 1, wherein the metal layer comprises circumferential grooves extending in a circumferential direction of the framing member formed on a surface of the metal layer.

8. The meter apparatus according to claim 1, wherein the lighting means comprises a lamp attached to a meter casing of the meter apparatus, the lamp being situated nearer the crew of the moving body than the character plate, and illuminating the first indicating marks of the plate member of the character plate.

9. The meter apparatus according to claim 8, wherein the lighting means illuminates the second surface of the framing member.

10. The meter apparatus according to claim 1, comprising a meter casing, and
    a lamp attached to the meter casing nearer the crew of the moving body than the character plate, and illuminating the first surface of the plate member of the character plate.

11. The meter apparatus according to claim 1, wherein the first surface of the plate member is frosted.

12. The meter apparatus according to claim 1, wherein one of the second surface of the framing member and the second indicating portion is a dark color, and the other is a light color.

13. The meter apparatus according to claim 8, wherein the portions of the second surface where the metal layer is coated comprise substantially the whole outside surface of the framing member which is outside of the second indicating marks.

* * * * *